United States Patent
Lee et al.

[15] 3,661,525
[45] May 9, 1972

[54] PROCESS FOR NEUTRALIZATION OF AMORPHOUS BORON

[72] Inventors: Benjamin Y. S. Lee; John Gonzales, both of China Lake, Calif.

[73] Assignee: The United States of America as represented by the Secretary of the Navy

[22] Filed: Aug. 25, 1969

[21] Appl. No.: 852,923

[52] U.S. Cl. ...............................................23/209
[51] Int. Cl. .........................................C01b 35/00
[58] Field of Search......................................23/209

[56] References Cited

UNITED STATES PATENTS 2,987,383   6/1961   Schulein et al.......................23/209 X

OTHER PUBLICATIONS

H. Remy, " Treatise on Inorganic Chemistry," Vol. I; Elsevier Publishing Company, New York, 1956, p. 324.

*Primary Examiner*—Oscar R. Vertiz
*Assistant Examiner*—G. Alvaro
*Attorney*—Edgar J. Brower and Roy Miller

[57] ABSTRACT

A process for the neutralization of large quantities of amorphous boron with anhydrous ammonia for use in fuel-rich solid propellant formulations wherein boron is used in large amounts.

1 Claim, No Drawings

PROCESS FOR NEUTRALIZATION OF AMORPHOUS BORON

GOVERNMENT INTEREST

The invention described herein may be manufactured and used by or for the Government of the United States of America for governmental purposes without the payment of any royalties thereon or therefor.

BACKGROUND OF THE INVENTION

This invention relates to a method of neutralization in large quantities of amorphous boron.

Recent developments in solid propellants for air augmentation application dictate the need for using amorphous boron as the fuel ingredient. The one commercially available boron most often used is highly acidic in nature and cannot be used as purchased because its acidic characteristic interferes with the binder cure mechanism of the propellant composition. Washing the amorphous boron with ammonium hydroxide solution has been done but this process involves the mechanical hand-stirring and agitation of the boron powder with the ammonium hydroxide solution, then filtering the boron slurry to recover the neutralized product. The damp product is then dried in a vacuum oven to remove all traces of moisture. This leaves a hard filter cake which must be broken up and screened before use. Another method of passivation of boron with ammonia gas is small scale and comprises placing amorphous boron in a funnel atop a filtering flask and introducing ammonia gas into the flask by a hose connection. The boron is passivated from the bottom up with the escaping gas. Both of these methods are time consuming and large scale passivation is not possible. The present method provides a quick, simple, and inexpensive means for the neutralization of large quantities of amorphous boron in one step.

It is therefore an object of this invention to provide a simple and safe method for the neutralization of highly acidic amorphous boron in large amounts for use as an ingredient in solid rocket propellant compositions.

DESCRIPTION OF THE INVENTION

In accordance with the present invention a rotary blender was filled to almost maximum capacity (35–40 lbs.), allowing some ullage at the top, with amorphous boron having a pH of 3.0–3.5. The lid thereto was secured. Ammonia gas was provided nearby in a cylinder having a connecting hose for charging the blender. The blender was charged with ammonia to approximately 5 psi and then rotated for about 10 minutes. Again the blender was charged with ammonia and the blender rotated for another 10 minutes. Following about one-half hour of ammonia passivation the contents were emptied into large pans ready for immediate use. The boron registered a pH of 8–9 (basic) as compared with 3.0–3.5 originally.

By this method large quantities of amorphous boron can be handled and treated in one step. Commercially available rotary blenders and tumblers can be used without major modifications of equipment and anhydrous ammonia is also commercially available. The neutralized boron can be handled completely in the dry state with minimum care as to the safety of those working with it.

What is claimed is:

1. A method for the treatment of amorphous boron which exhibits acidic characteristics comprising
   a. filling a rotary blender with said boron leaving a slight ullage at the top;
   b. charging said blender with ammonia to about 5 psi;
   c. rotating said blender for about 10 minutes;
   d. repeating steps (b) and (c);
   e. passivating in said ammonia for about one-half hour; whereby the acidic characteristic of said boron is neutralized.

* * * * *